United States Patent [19]

Arbeletche et al.

[11] 4,381,897
[45] May 3, 1983

[54] INSTALLATION FOR TRANSPORTING FINE-GRAINED MATERIAL

[75] Inventors: Carlos Arbeletche, Beckum; Ingo Boelcke, Hamm; Peter Poehlmann, Munster; Klaus Kirchner, Sendenhorst, all of Fed. Rep. of Germany

[73] Assignee: Krupp Polysius AG, Beckum, Fed. Rep. of Germany

[21] Appl. No.: 362,909

[22] Filed: Mar. 29, 1982

Related U.S. Application Data

[63] Continuation of Ser. No. 194,032, Oct. 6, 1980, abandoned.

[51] Int. Cl.³ .............................................. B65G 53/40
[52] U.S. Cl. ..................................... 406/93; 406/120; 406/127; 406/194
[58] Field of Search ............... 406/109, 119, 120, 127, 406/93, 144, 194; 222/265, 278; 141/11, 67, 68, 95, 99, 248

[56] References Cited

U.S. PATENT DOCUMENTS

| | | | |
|---|---|---|---|
| 1,686,713 | 10/1928 | Scott | 406/194 |
| 4,097,092 | 6/1978 | Lapple | 406/93 |
| 4,111,492 | 9/1978 | Mraz | 406/120 |
| 4,269,548 | 5/1981 | Von Bennigsen-Mackiewicz | 406/120 X |

Primary Examiner—John J. Love
Assistant Examiner—L. E. Williams
Attorney, Agent, or Firm—Learman & McCulloch

[57] ABSTRACT

An installation for transporting fine-grained material to a consumer using two alternately filled and emptied pneumatic pressure vessels (3, 4) together with an outlet valve (12, 12') and a control nozzle (15, 15') in the material discharge pipe of each of the two pressure vessels. The control nozzles (15, 15') are connected to an air distributor (18) through which the control nozzle receives a reduced amount of compressed air when the material discharge pipe is shut off.

With an installation such as this, a continuous and exactly metered delivery of fine-grained material is obtained without any mechanically moved parts in the delivery path and with a low rate of flow in the delivery pipe.

5 Claims, 3 Drawing Figures

INSTALLATION FOR TRANSPORTING FINE-GRAINED MATERIAL

This is a continuation, of application Ser. No. 194,032, filed in the U.S. Pat. Office on Oct. 6, 1980, now abandoned.

This invention relates to an installation for the continuous and exactly metered transport of fine-grained material, particularly powdered coal, from a storage vessel or producer to a consumer.

Installations for transporting powdered coal are known in which the powdered coal is withdrawn from a storage vessel via a scale, transported by means of a screw conveyor and delivered by a pneumatic conveyor to the powdered coal firing unit. The main disadvantages of this known installation lie in the susceptibility to wear of the mechanically moved parts situated in the delivery path and of the conveyor pipe through which the material has to be blown at high speed. In addition, it is difficult in known installations of this type to obtain the necessary operational safety and, above all, to keep the operating rooms passable to personnel. Finally, another disadvantage lies in the large amount of energy required for transporting the powdered coal.

In addition, it is known that fine material can be pneumatically conveyed by means of pneumatic pressure-vessel conveyors although in principle conveyors of this type are only designed for batch operation. Although several such pneumatic pressure-vessel conveyors could be operated in alternation, considerable difficulties would be involved in obtaining a continuous and exactly metered stream of material.

Accordingly, the object of the present invention is to construct an installation of the kind mentioned at the beginning in such a way that a continuous and exactly metered delivery of fine-grained material, particularly powdered coal, is obtained without any mechanically moved parts in the delivery path and at a low rate of flow in the delivery pipe and further in such a way that at the same time it is possible to make the installation as a whole resistant to pressure surges so that the operating rooms remain passable to personnel, the installation is not damaged in the event of possible explosions and no powder is able to escape outwards, thereby preventing secondary explosions.

According to the invention, this object is achieved by combination of the following features:

(a) at least two alternately filled and emptied pneumatic pressure vessels supported by pressure measuring elements are provided between the storage vessel or producer and the consumer;

(b) an outlet valve and, connected in series therewith, a control nozzle which pneumatically influences the stream of material are arranged in the material discharge pipe of each of the two pressure vessels;

(c) the control nozzles are connected to an air distributor through which—when the material discharge pipe of the associated pressure vessel is open—an amount of control air corresponding to the particular amount of material being conveyed and—when the material discharge pipe of the associated pressure vessel is closed—a reduced amount of control air can be delivered.

On the one hand, the use of pneumatic pressure vessels for transporting the material avoids all wear-prone, mechanically moved parts in the delivery path between the storage vessel or producer and the consumer and, on the other hand, enables all those parts of the installation situated between the storage vessel or producer and the consumer to be made resistant to pressure surges. In the case of a powdered coal conveying installation, this means that the operating rooms remain satisfactorily passable to personnel.

According to the invention, the problem of obtaining a continuous and exactly metered delivery of the material (which is particularly important in the case of a powdered coal conveying installation for maintaining optimal combustion conditions) despite the use of alternately filled and emptied pneumatic pressure vessels is solved by the use of special control nozzles. These control nozzles, which pneumatically influence the stream of material, are distinguished from mechanical control elements by their particularly wide control range which enables the required amount of material for transport to be adjusted and controlled particularly rapidly.

Another important feature is that that control nozzle of which the associated pressure vessel is being filled also receives a reduced amount of control air through the air distributor. In this way, the control nozzle in question and the associated material discharge pipe are kept free from deposits of material, even in the non-active state, which ensures that the control nozzle is immediately ready for operation when the pressure vessels are switched over and avoids fires which could lead to explosions. This constant readiness for operation of the non-active control nozzle in conjunction with its wide control range and the resulting, high response speed ensure that delivery of the fine material takes place smoothly and continuously in accordance with the preselected required value, even at the critical time when the pressure vessels are being switched over.

In an installation where the material discharge pipe of each pressure vessel opens into a pneumatic delivery pipe connected to a compressed-air source, the control air pipe carrying the control air to the control nozzle is connected in acordance with the invention to the compressed air pipe connected to the delivery pipe between a differential pressure gauge and a valve for controlling the quantity of delivery air. If, in this way, the control air is branched off from the delivery air, the total amount of delivery air remains constant, even in the event of variations in the quantity of control air (which of course also enters the stream of material being conveyed).

These and other details of the invention are the subject of the Subsidiary Claims and are described in more detail in the following with reference to an example of embodiment illustrated in the accompanying drawings, wherein:

FIG. 1 diagrammatically illustrates one embodiment of the installation according to the invention.

Figure 1:
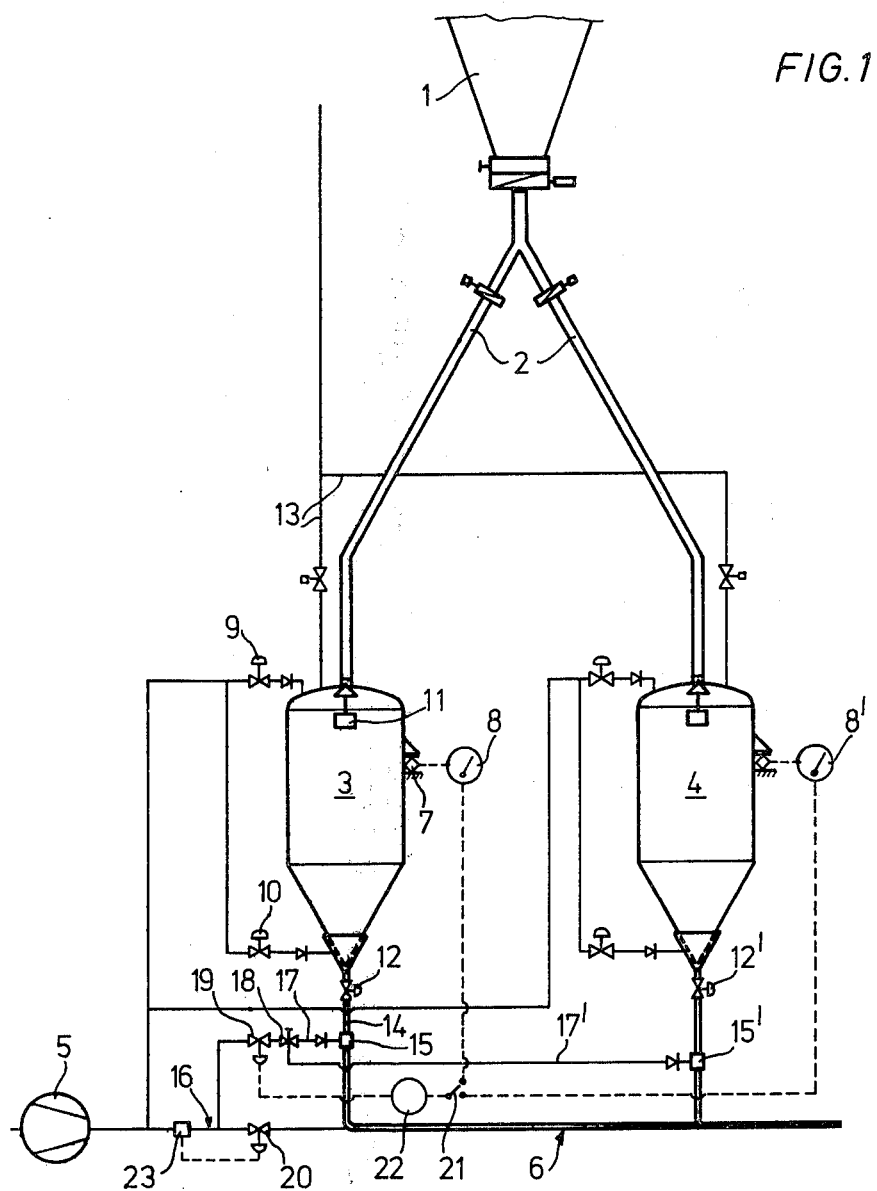

The installation shown in FIG. 1 comprises a storage vessel 1, of which only part has been shown, a distributing chute 2, two pneumatic pressure vessels 3 and 4, a compressed-air source 5 and a pneumatic delivery pipe 6 leading to a consumer (not shown).

The pneumatic pressure vessels 3 and 4 are identical in construction, so that it will be sufficient to describe the pressure vessel 3. It is supported by pressure measuring elements 7 which are connected to a scale 8. The pressure vessel 3 is further provided in known manner with an upper pressure controller 9, a differential pressure controller 10 for the outlet zone, an inlet valve 11, an outlet valve 12 and a vent pipe 13.

A control nozzle 15 is connected in series with the outlet valve 12 in the material discharge pipe 14, its constructional details being explained hereinafter with reference to FIGS. 2 and 3.

The material discharge pipe 14 opens into the pneumatic delivery pipe 6 which is connected to the compressed-air source 5 through a compressed-air pipe 16.

The control air pipes 17, 17' of the control nozzles 15, 15' of the two pressure vessels 3, 4 are connected to a common air distributor 18 which is connected to the compressed air pipe 16 through a control valve 19 activated by the scale 8. Another control valve 20 preceded by a differential pressure gauge 23 is arranged between the compressed air pipe 16 and the delivery pipe 6.

The two scales 8, 8' of the pressure vessels 3,4 are connected through a reversing switch 21 to a controller 22 which acts on the control valve 19.

The installation operates as follows:

The fine-grained material, for example powdered coal, is delivered from the storage vessel 1 via the distributing chute 2 and the open inlet valve 11 into one of the two pressure vessels. After the pressure vessel in question (for example 3) has been filled, the scale 8 delivers a signal which closes an outlet fitting provided on the storage vessel and, with delay, the inlet valve 11 of the pressure vessel 3.

Through the upper pressure controller 9, compressed air is introduced into the pressure vessel 3 filled with material. At the same time, the material is loosened up by the compressed air blown into the outlet zone of the pressure vessel 3 via the differential pressure controller 10. When the necessary upper pressure is reached, the control valves 19 and 20 open, as does the outlet valve 12, and the material is now pneumatically delivered to the consumer through the delivery pipe 6, the amount of material (per unit of time) being preselected through the controller 22.

Commensurate with the required value selected through the controller 22, the control nozzle 15 of the pressure vessel 3 in the process of being emptied receives through the air distributor 18 and the control air pipe 17 a corresponding amount of control air which constricts the flow of material through the control nozzle to a greater or lesser extent and hence only allows the required amount of material to enter the delivery pipe 6.

During the emptying of the pressure vessel 3, the pressure vessel 4 is filled. The outlet valve 12' is closed at this stage. However, the control nozzle 15' arranged in series with the closed outlet valve 12' receives through the control air pipe 17' a small amount (reduced in relation to the active state) of control air by which the control nozzle 15' is continuously blown clean and hence kept in immediate readiness for operation. When thereafter the delivery of material is switched over from the pressure vessel 3 to the pressure vessel 4 by closure of the outlet valve 12 and opening of the outlet valve 12', delivery is switched smoothly and without interruption from one pressure vessel to the other by the inertia-free response of the control nozzle 15'.

Figure 2:
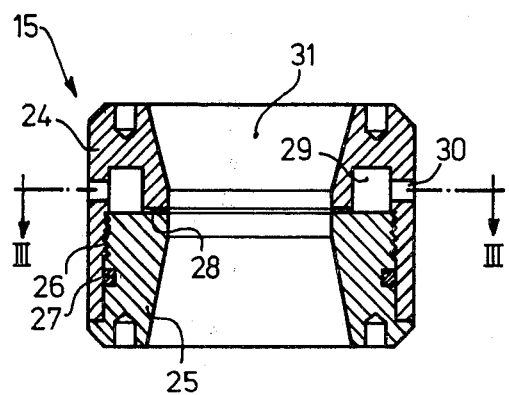
FIG. 2 is a longitudinal section through one embodiment of the control nozzle.
Figure 3:
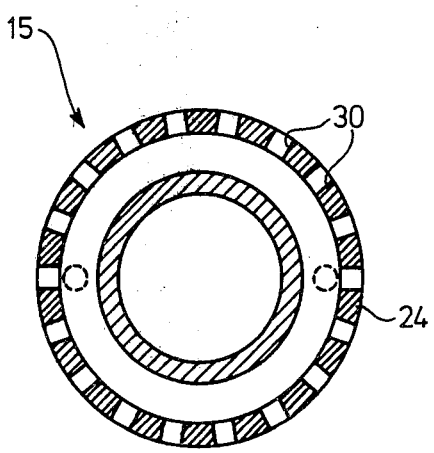
FIG. 3 is a cross-section through the control nozzle on the line III—III in FIG. 2.

One example of embodiment of the control nozzle 15 is shown in detail in FIGS. 2 and 3. The control nozzle consists of an upper part 24 and a lower part 25 which are screwed together through a screw thread 26 and which in addition are sealed by a seal 27. Between the upper part 24 and the lower part 25, there is a very narrow annular gap 28. In addition, an annular passage 29 communicating with the annular gap 28 is present in the upper part 24, being connected through a number of radial bores 30 to the control air pipe 17 (cf. FIG. 1).

The amount of control air delivered to the control nozzle 15 through the control air pipe 17 is blown into the interior 31 of the control nozzle 15 through the annular passage 29 and the precision-calibrated annular gap 28. It constricts the flow of material to a greater or lesser extent and, accordingly, only allows the required amount of material to enter the delivery pipe 6.

The construction according to the invention with the described control nozzle is distinguished from known constructions (with upper pressure or delivery pressure control) by a considerably greater control speed and response sensitivity. The control characteristic of the control nozzle may be adapted within wide limits through the dimensions selected for the annular gap 28. In this connection, the annular gap 28 may be varied as required by screwing the upper part 24 and lower part 25 into one another to a greater or lesser extent. The control nozzle is easy to maintain and clean.

The dimensions of the control nozzle are governed by the following parameters:
the fine-grained material (texture, particle size, temperature, flow behaviour),
the distance over which the material has to be conveyed,
the conveying capacity,
the required control range,
and by the pressure conditions prevailing at the end of the delivery pipe.

In order to standardise the air pressure prevailing in the individual pipes, an air vessel may be connected to the compressed air source 5.

We claim:

1. Apparatus for the continuous transport of fine-grained material from a supply thereof to a consumer, said apparatus comprising at least two pneumatic pressure storage vessels interposed between and communicating with said supply and said consumer, each of said vessels having a discharge pipe containing an outlet valve and a control nozzle in series with said valve; means for alternately opening and closing each of said outlet valves for alternately emptying a selected one of said vessels; conduit means for connecting each of said control nozzles to a source of compressed air for delivering compressed air to each of said control nozzles simultaneously; and air distributor means in said conduit means operable to deliver to the control nozzle in series with the open one of said outlet valves a greater quantity of compressed air than is delivered to the control nozzle in series with the closed one of said outlet valves.

2. Apparatus according to claim 1 including means for rendering said vessels and all parts associated therewith resistant to pressure surges.

3. Apparatus according to claim 1 wherein the discharge pipe of each vessel communicates with said consumer via a pneumatic delivery pipe connected to said source, and wherein said conduit means is connected to said delivery pipe between a differential pressure gauge and a valve for controlling the quantity of air admitted to said delivery pipe and to said conduit means.

4. Apparatus according to claim 1 wherein each of said control nozzles has a pair of parts joined together to form an annular gap communicating with said discharge pipe, one of said parts having an annular passage establishing communication between said gap and said compressed air source.

5. Apparatus according to claim 4 wherein said parts are adjustable to vary the size of said gap.

* * * * *